United States Patent [19]
Choy

[11] Patent Number: 4,629,036
[45] Date of Patent: Dec. 16, 1986

[54] SHOPPING CART BRAKING WHEEL

[76] Inventor: Kim L. Choy, 735 28th Ave., San Mateo, Calif. 94403

[21] Appl. No.: 639,736

[22] Filed: Aug. 13, 1984

[51] Int. Cl.⁴ ............................................. F16D 51/00
[52] U.S. Cl. .................... 188/1.12; 16/35 R; 188/177
[58] Field of Search ........ 188/177, 174, 139, 134–136, 188/82.1, 82.2, 82.3, 82.34, 82.7, 31, 30; 16/35 R; 301/6 R

[56] References Cited

U.S. PATENT DOCUMENTS

| | | | |
|---|---|---|---|
| 3,366,201 | 1/1968 | Pesta | 16/35 R X |
| 3,608,693 | 9/1971 | Stosberg et al. | 188/5 X |
| 3,620,333 | 11/1971 | Menzi | 188/30 |
| 3,623,575 | 11/1971 | Schiltigheim | 188/177 X |
| 4,333,207 | 6/1982 | Atwood | 188/1.12 X |

FOREIGN PATENT DOCUMENTS

| | | | |
|---|---|---|---|
| 2050105 | 4/1972 | Fed. Rep. of Germany | 16/35 R |
| 1353192 | 5/1974 | United Kingdom | 188/1.12 |

*Primary Examiner*—Bruce H. Stoner, Jr.
*Assistant Examiner*—Micheal P. Gilday
*Attorney, Agent, or Firm*—Henry G. Kohlmann

[57] ABSTRACT

This invention relates generally to devices which are designed to prevent loss of shopping carts from shopping center parking lots or other areas where use thereof is expected. More specifically, it relates to a particular wheel design which locks when removal is attempted and thereby provides a braking action under certain circumstances, namely when removal of the shopping cart from a given area is attempted. This locking of the wheel occurs when the longitudinal axis of the cart to which the wheel is attached, which is normally horizontal, is tilted away from the horizontal in order to negotiate curbs or when traversing a sloped surface such as a driveway and the like.

12 Claims, 6 Drawing Figures

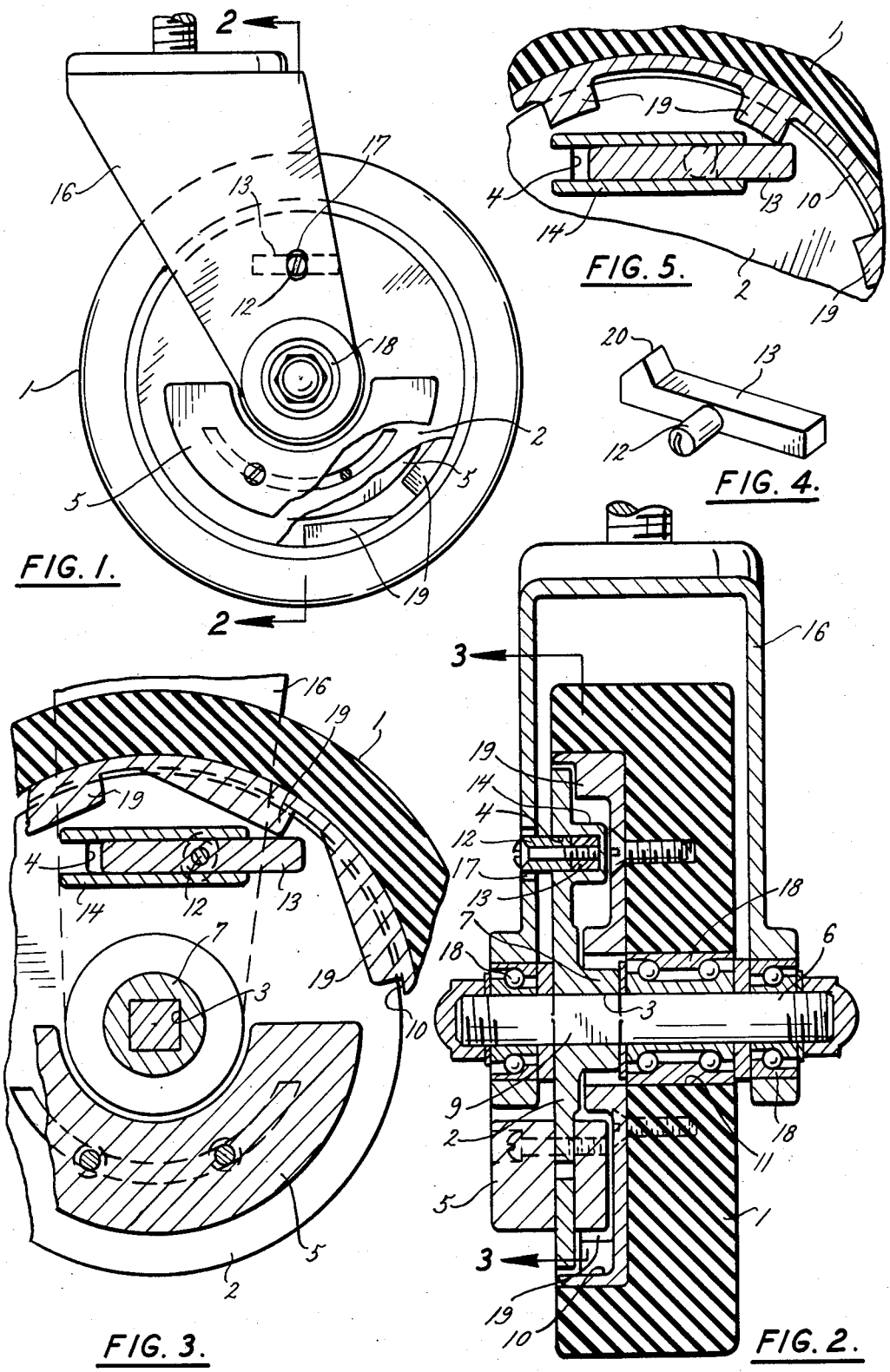

SHOPPING CART BRAKING WHEEL

BACKGROUND OF THE INVENTION

1. Field of the Invention

This invention relates generally to devices which are designed to prevent loss of shopping carts from shopping centers and the like. More particularly, it relates to a specific wheel design which has a braking mechanism activated by deviation of the longitudinal axis of the shopping cart from the horizontal.

2. Prior Art

Many devices have been disclosed in the prior art which basically fall into two general classes. First, there are those devices typified by U.S. Pat. No. 3,356,185 by Isaack which involve braking devices which engage the wheels of a shopping cart in some manner which prevents rotation thereby braking the cart. Second there are those devices as typified by U.S. Pat. No. 3,405,783 to Clark which cause entrapment of the wheels of said cart such that either the hub of the wheels or some other portion of the cart engages the surface of the entraping mechanism. The instant invention falls generally into the first category. As can be noted, however, the device in Isaack is very complex and does not cause braking until the wheel is raised off the ground, hence one could simply exit down a driveway with such a cart and thereby defeat the purpose of the mechanism. Alternatively, very expensive groving of driveways and other areas is required to entrap or otherwise engage wheels of carts which creates a dangerous surface condition and increases the likelihood of a customer or other person tripping or falling because of the surface deviation necessary for the device to operate. The instant invention utilized the existing surface conditions with little, if any, modification to provide the braking action. The instant invention addresses these inherent prior art defects as is described herein and accordingly, it is an object of this invention to provide a braking apparatus which allows a very simple maintenance free wheel locking construction. It is a further object of this invention to provide a braking apparatus which will engage and disengage automatically.

BRIEF DESCRIPTION OF THE DRAWINGS

FIG. 1 is a side view of the braking wheel and mounting bracket having a cutaway view of a portion of the interior of the wheel.

FIG. 2 is a front cross-sectional view of the wheel.

FIG. 3 is a side cross-sectional view of a portion of the wheel.

FIG. 4 is an objective view of slot pin and an engaging block with an alternative structure on one end thereof.

FIG. 5 is a cross-sectional view of the slot pin, a rectangular engaging block, and the mount for said block.

DESCRIPTION OF THE PREFERRED EMBODIMENT

Figure 6:
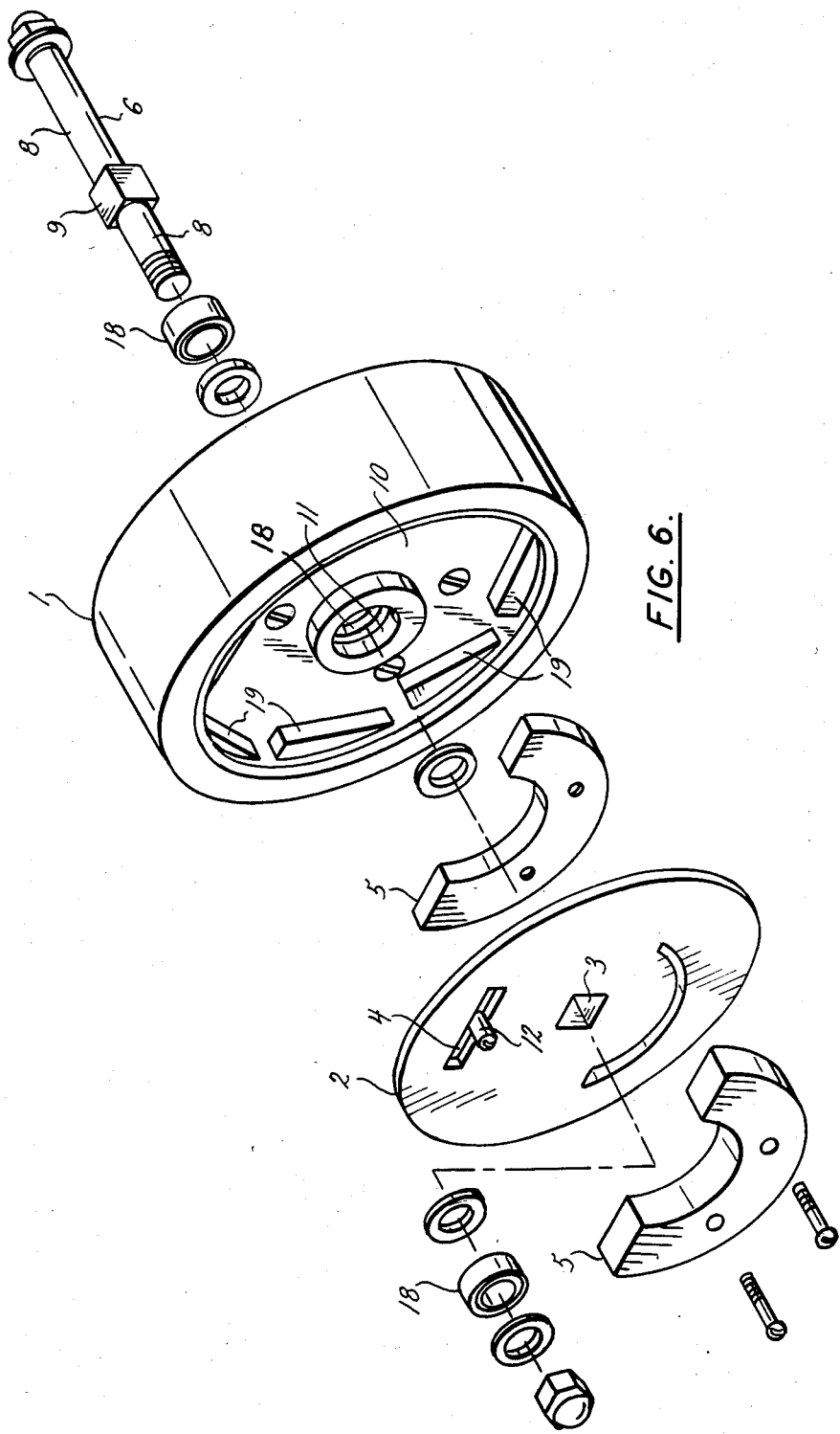
FIG. 6 is a exploded view of the braking wheel and the various elements thereof.

With reference to the drawings, FIG. 6 shows the braking wheel in an exploded view detailing each of the elements thereof. The wheel comprises a wheel body 1 having a flat member or cover 2. Said cover 2 has a square hole 3 in the center for receiving an axle and a rectangular slot 4 on one side thereof, the longitudinal axis of said slot being perpendicular to the axle 6. Said axle 6 has a cylindrical portion 8 for engaging a bearing 18 and a square portion 9 for engaging said hole 3. Internally of said wheel body 1 are a plurality of teeth 19 spaced about the periphery of a circular recess 10 in said wheel body 1. As shown in FIGS. 2 and 6 the teeth are part of a circular insert which fits into circular recess 10 although they could be integral with the wheel body 1. Said teeth 19 are disposed axially of said recess. Said wheel body 1 further has a circular hole 11 for receiving bearing 18 which engages one of the circular portions 8 of said axle 6. FIG. 2 shows the inner surface of the wheel cover 2. Because the cover of the preferred embodiment is thin the square hole 3 is supported by an elongated cylindrical member 7 integral with the wheel cover 2 which also has a square hole therein which communicates with hole 3. This is, however, not a requirement to practice this invention. Slot 4 slidably receives a slot pin 12 fixedly attached to a rectangular bar or arm 13 as shown in FIGS. 3 and 5 which is slidably held in position by a housing or cover 14 as shown in FIGS. 2 and 5 fixedly attached to said wheel cover 2.

FIG. 4 shows an alternate form of bar 13 having a generally triangular protrusion 20 thereon, as opposed to a merely rectangular shape as shown in FIG. 5, which engages the rectangular teeth 19 as shown in FIG. 5 and would require the wheel to be reversed in direction of rotation prior to automatic release thereof as is contemplated by this invention. The alternative preferred configuration of said teeth 19 is generally triangular as shown in FIGS. 1 and 6 permit the triangular portions of the bar 13 to engage with said teeth 19 along substantially the entire side of said teeth. When the bar 13 is slid along the slot 4 the slot pin is moved relative to said cover and the triangular portion will engage said teeth. Further rotation of said wheel will cause the teeth to pull the bar 13 toward the periphery of said recess and lock bar 13 into juxtaposition with said teeth 19. The wheel will then not rotate even if the orientation of the cart is again returned to the horizontal. Disengagement of bar 13 with said triangular teeth 19 is accomplished by reversing rotation of said wheel and causing adjacent teeth to push said bar 13 to a central neutral position where it will not engage said teeth 19. On return to the horizontal weight 5 will reorient the slot pin 12 to the center of said slot 4 until the horizontal disposition of the longitudinal axis of said cart is once again altered.

FIG. 5 illustrates with a cutaway view the manner in which the rectangular bar 13 engages said teeth 19. In FIG. 5 rectangular teeth 19 are shown. Gravity acting on the weight 5 has caused the cover 2 to remain in its original position. Relative rotation of the wheel bracket or mount 16 has driven the slot pin 12 to the right, as shown in FIG. 5. It should be noted that in the instant invention lateral motion is not restricted to one direction in that the braking action may be accomplished by driving the bar 13 in either direction depending on either the positive or negative slope of the horizontal axis of the cart. For simplicity only one direction is illustrated. This driving action is caused by gravitational force acting on the weight which causes the bar 13 to engage the teeth 19 along the periphery of the circular recess 10 thereby causing rotation of the wheel relative to the wheel bracket 16 to terminate. It is to be noted in FIG. 1 that the wheel bracket 16 has an elongated hole 17 which receives the slot pin 12 which allows motion of the pin along the vertical axis of the mounting bracket 16. Accordingly, relative rotation between the cover plate 2 and the wheel bracket 16 will cause linear movement of the slot pin 12 causing bar 13 to engage said teeth 19. The speed of reset is directly dependent on the mass of weight 5 and the friction in bearing 18 which should be as low as is possible. In any event, a mass to friction relationship should be such as to facilitate relative rotation between the wheel cover 2 and wheel bracket 16 by the weight 5 alone.

It should be also noted in FIG. 6 that weight 5 is in two sections. This is not necessary and the entire mass may be placed on one side or the other or even incorporated into the cover 2 itself if no adjustment of the angle of deviation is desired.

Finally, the weight 5, as shown in FIG. 3 is slidably attached to cover 2 and may be slidably adjusted through rotational or lateral motion although FIG. 3 illustrates rotational adjustment. This permits adjustment of the location of the weight on each wheel cover 2 of each wheel body 1. This allows selection of the magnitude of the angle of deviation from the horizontal required before the locking mechanism activates. Therefore the rear wheels of a cart could be adjusted to lock at a lower angle of positive deviation than the front wheels and the front wheels of such cart could be adjusted to lock at a lower negative angle of deviation from the horizontal. FIGS. 2 and 3 show additional views of the instant invention so as to enable one to easily reduce the same to practice.

Having thus described the invention, what is claimed is:

1. A wheel structure comprising:
   a. an axle
   b. an axle mount adapted for rotatably receiving said axle:
   c. a wheel housing mounted on said axle:
   d. a circular recess internally of said wheel housing having a plurality of teeth disposed inwardly of the periphery of said recess;
   e. a wheel cover mounted on said axle having a flat member adapted for engaging said axle without relative rotational motion between said member and said axle and a weight incorporated into one side of said flat member whereby said member has a center of gravity located away from the point at which said member engages said axle;
   f. a slot pin slidably attached to said wheel cover and slidably engaging said axle mount; and
   g. an arm attached to said slot pin adapted for engaging said teeth whereby said arm may selectively engage said wheel housing.

2. A wheel structure as described in claim 1 wherein said flat member has a square hole in the center thereof and said weight is slidably attached to said flat member adjacent to said hole.

3. A wheel structure as described in claim 2 wherein said arm is rectangular and fixedly attached to said slot pin with the longitudinal axis thereof generally disposed horizontally.

4. A wheel structure comprising:
   a. an axle received by a mount;
   c. a circular member having a concentric circular recess therein rotatably attached to said axle;
   d. a circular insert, having a plurality of spaced teeth disposed radially inwardly, adapted for insertion into said recess;
   e. a means for engaging said circular insert, comprising a first elongated member disposed for slidably engaging said mount, and a second elongated member fixedly attached to the first and disposed generally horizontally and transverse of said axle, having ends which are smaller than the space between said teeth and which conform to the shape of said teeth for releasably engaging the same.

5. A wheel structure as described in claim 4 wherein said engaging means comprises: a housing for slidably receiving said second elongated member which prevents substantial rotational motion of said second member.

6. A wheel structure as described in claim 5 further comprising:
   a. a cover for the recess in said circular member, mounted ion said axle;
   b. a means for fixedly mounting said housing on said cover.

7. A braking apparatus comprising:
   a. an axle;
   b. a mount having at least one mount hole rotatably receiving said axle and at least one additional hole for slidably receiving a pin;
   c. a wheel having a circular recess concentric with said wheel mounted on said axle;
   d. a plurality of teeth mounted peripherally of said recess and disposed toward said axle;
   e. a cover for said recess having a hole in the center thereof for receiving said axle and a slot on at least one side thereof;
   f. an elongated member for releasably engaging said teeth slidably attached to said cover having the pin fixedly attached thereto extending through said slot and slidably engaging said mount through said additional hole; and
   g. a weight adjustably attached to one side of said cover adapted for maintaining said cover's disposition with respect to the horizontal irrespective of rotation of the wheel whereby rotation of said mount with respect to said cover causes said pin to slide within said cover, which in turn causes said elongated member to engage said teeth and prevent rotation of said wheel.

8. A braking apparatus as described in claim 7 wherein said elongated member is adapted for releasably engaging said teeth and which conforms to the shape of said teeth on at least one end thereof.

9. A braking apparatus as described in claim 8 wherein said teeth are generally rectangular and said elongated member conforms to the shape of said rectangular teeth on at least one side thereof.

10. A braking apparatus as described in claim 8 wherein said teeth are generally triangular and said elongated member conforms to the shape of said triangular teeth on at least one side thereof.

11. A braking apparatus as described in claim 8 wherein said elongated member has two ends each of which is adapted for releasably engaging said teeth and each end of which conform to the shape of the sides of said teeth.

12. A braking apparatus as described in claim 8 wherein said elongated member is held in position by a housing integral with said cover which slidably receives said member to prevent substantial rotation movement thereof.

* * * * *